US012136204B1

(12) United States Patent
Paik

(10) Patent No.: US 12,136,204 B1
(45) Date of Patent: Nov. 5, 2024

(54) METHOD AND APPARATUS FOR INTEGRATING IMAGE ENHANCEMENT AND TRAINING DATA GENERATION USING A GENERATIVE RECURRENT NEURAL NETWORK MODEL

(71) Applicant: CHUNG ANG UNIVERSITY INDUSTRY ACADEMIC COOPERATION FOUNDATION, Seoul (KR)

(72) Inventor: Joon Ki Paik, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 18/661,749

(22) Filed: May 13, 2024

Related U.S. Application Data

(63) Continuation of application No. PCT/KR2023/021687, filed on Dec. 27, 2023.

(30) Foreign Application Priority Data

Nov. 15, 2023 (KR) .......................... 10-2023-0158108

(51) Int. Cl.
*G06V 10/771* (2022.01)
*G06T 7/00* (2017.01)
(52) U.S. Cl.
CPC .......... *G06T 7/0002* (2013.01); *G06V 10/771* (2022.01); *G06T 2207/20084* (2013.01); *G06T 2207/30168* (2013.01)

(58) Field of Classification Search
CPC ......... G06T 7/0002; G06T 2207/20084; G06T 2207/30168; G06V 10/771
USPC ........................................................ 382/275
See application file for complete search history.

(56) References Cited

U.S. PATENT DOCUMENTS

2023/0135978 A1  5/2023  Price et al.

FOREIGN PATENT DOCUMENTS

KR    10-2020-0046163 A    5/2020
KR    10-2021-0056619 A    5/2020

OTHER PUBLICATIONS

Ding, Hao, et al. "ContransGAN: convolutional neural network coupling global swin-transformer network for high-resolution quantitative phase imaging with unpaired data." Cells 11.15 (2022): 2394. (Year: 2022).*
Zhang, Bowen, et al. "Styleswin: Transformer-based gan for high-resolution image generation." Proceedings of the IEEE/CVF conference on computer vision and pattern recognition. 2022. (Year: 2022).*

(Continued)

*Primary Examiner* — Jonathan S Lee

(57) ABSTRACT

Disclosed are a method and apparatus for integrating image enhancement and training data generation using a generative recurrent neural network model. The method of integrating image enhancement and training data generation using a generative recurrent neural network model includes: (a) receiving a target image as input, and (b) applying the target image to a trained generative recurrent neural network model to selectively generate any one of a high-quality image with enhanced image quality and a low-quality image depending on a type of the target image.

8 Claims, 8 Drawing Sheets

(56) References Cited

OTHER PUBLICATIONS

Liang, Jingyun, et al. "Swinir: Image restoration using swin transformer." Proceedings of the IEEE/CVF international conference on computer vision. 2021. (Year: 2021).*
Tu, Jingzhi, et al. "SWCGAN: Generative adversarial network combining swin transformer and CNN for remote sensing image super-resolution." IEEE Journal of Selected Topics in Applied Earth Observations and Remote Sensing 15 (2022): 5662-5673. (Year: 2022).*
Ren, Tingdi, et al. "Reinforced swin-convs transformer for simultaneous underwater sensing scene image enhancement and super-resolution." IEEE Transactions on Geoscience and Remote Sensing 60 (2022): 1-16. (Year: 2022).*
Zeng, Yanhong, et al. "Improving visual quality of image synthesis by a token-based generator with transformers." Advances in Neural Information Processing Systems 34 (2021): 21125-21137. (Year: 2021).*
Wang, Shibin, Zidiao Gao, and Dong Liu. "Swin-GAN: generative adversarial network based on shifted windows transformer architecture for image generation." The Visual Computer 39.12 (2023): 6085-6095. (Year: 2023).*
Notice of Preliminary Examination Results from Korean Intellectual Property Office dated Dec. 20, 2023 for KR Patent Application No. 10-2023-0158108.
Notice of Decision to Grant a Patent from Korean Intellectual Property Office dated Dec. 28, 2023 for KR Patent Application No. 10-2023-0158108.

* cited by examiner

METHOD AND APPARATUS FOR INTEGRATING IMAGE ENHANCEMENT AND TRAINING DATA GENERATION USING A GENERATIVE RECURRENT NEURAL NETWORK MODEL

CROSS-REFERENCE TO RELATED APPLICATION

This application is a continuation of pending PCT International Application No. PCT/KR2023/021687, which was filed on Dec. 27, 2023, and which claims priority to Korean Patent Application No. 10-2023-0158108 which was filed in the Korean Intellectual Property Office on Nov. 15, 2023. The disclosures of which are hereby incorporated by reference in their entireties.

TECHNICAL FIELD

The present invention relates to a method and apparatus for integrating image enhancement and training data generation using a generative recurrent neural network model.

BACKGROUND ART

Digital video has the disadvantage of deteriorating image quality due to the shooting environment, limitations in optical system performance, limitations in image sensor functions, etc. To enhance the deteriorated image quality, an artificial intelligence-based image enhancement model is being used.

An artificial intelligence-based image enhancement technology has continuously enhanced performance by evolving into a method based on noise removal and resolution enhancement techniques using a convolutional neural network (CNN), a method of using a generative adversarial neural network, a method of using a vision transformer, a method of using a swin transformer, a method of using a diffusion model, etc.

The artificial intelligence-based image enhancement model requires training using pairs of high-quality images and low-quality images. To ensure the performance of the artificial intelligence-based image enhancement model, a sufficient amount of diverse training image data is required, but it is very difficult or impossible to secure training data in a special environment other than disclosed training data.

In addition, as the artificial intelligence-based image enhancement models develop and become more complex, the amount and type of data required for training rapidly increases, the time required for training also increases, and there are many limitations in effectively implementing the model in special environments.

For example, when trying to enhance a low light level in an autonomous vehicle, the general image enhancement model that does not take into account the characteristics of images obtained on a road is not only difficult to provide optimal performance, but also has problems such as implementation cost and processing time.

DISCLOSURE

Technical Problem

It is an object to provide a method and apparatus for integrating image enhancement and training data generation using a generative recurrent neural network model.

It is another object to provide a method and apparatus of integrating image enhancement and training data generation using a generative recurrent neural network model that can not only generate various types of low-quality images with only high-quality image or video input, but also enhance the generated low-quality images through a trained model.

Technical Solution

According to an aspect of the present invention, there is provided a method of integrating image enhancement and training data generation using a generative recurrent neural network model.

According to an embodiment of the present invention, there may be provided a method of integrating image enhancement and training data generation using a generative recurrent neural network model, including: (a) receiving a target image as input; and (b) applying the target image to a trained generative recurrent neural network model to selectively generate any one of a high-quality image with enhanced image quality and a low-quality image depending on a type of the target image.

The generative recurrent neural network model may include a trained image enhancement neural network module and a trained deteriorated image generation module, when the image quality of the target image is equal to or lower than a standard image quality, only the trained image enhancement neural network module may operate and the trained deteriorated image generation module may not operate, and when the image quality of the target image exceeds the standard image quality, only the trained deteriorated image generation module may operate and the trained image enhancement neural network module may not operate.

The method may further include, prior to the step (a), training the generative recurrent neural network model using an image data set including a first image and a second image, wherein the training the generative recurrent neural network model may include training the generative recurrent neural network model by applying the first image and the second image to the generative recurrent neural network model to generate a high-quality image with enhanced image quality for a low-quality image among the first image and the second image and generate the low-quality image using the high-quality image with enhanced image quality.

The first image and the second image may be pair images with different image quality for the same scene.

The generative recurrent neural network model may include: an image enhancement neural network module that generates the high-quality image with enhanced image quality after receiving the low-quality image among the first image and the second image; a deteriorated image neural network module that is located behind the image enhancement neural network module, and receives the high-quality image with enhanced image quality and then generates the low-quality image; a first discrimination module that adjusts a weight of the image enhancement neural network module to minimize first consistency loss for a high-quality image among the first image and the second image and the high-quality image with enhanced image quality; and a second discrimination module that calculates second consistency loss using the low-quality image among the first image and the second image and the low-quality image output from the deteriorated image neural network module and then adjusts a weight of the deteriorated image neural network module so that the second consistency loss is minimized.

The image enhancement neural network module and the deteriorated image neural network module may be composed of a plurality of transformer-based encoders and a decoder using a plurality of convolutional layers, respectively, and the plurality of transformers and the plurality of convolution layers may be configured to have a symmetrical structure to each other.

Each of the transformers may include: a convolution layer that extracts a feature map of the input image; a split layer that splits the extracted feature map; a first swin transformer block that receives the split feature map and extracts a first global feature map; a first residual block that is located behind the first swin transformer block and receiving the first global feature map to extract a first local feature map; a second residual block that receives the split feature map and extracts a second local feature map for the split feature map; a second swin transformer block that is located behind the second residual block and receives the second local feature map and extracts a second global feature map, and the first local feature map output from the first residual block and the second global feature map output from the second swin transformer block may be combined, and then pass through a convolution layer to output the feature map.

According to another aspect of the present invention, there is provided an apparatus for integrating image enhancement and training data generation using a generative recurrent neural network model.

According to an embodiment of the present invention, there may be provided a computing device, including: a memory that stores at least one instruction; and a processor that executes the instructions stored in the memory, wherein each of the instructions executed by the processor may perform: (a) receiving a target image as input; and (b) applying the target image to a trained generative recurrent neural network model to selectively generate any one of a high-quality image with enhanced image quality and a low-quality image depending on a type of the target image.

Advantageous Effects

By providing a method and apparatus for integrating image enhancement and training data generation using a generative recurrent neural network model according to an embodiment of the present invention, it is possible to not only generate various types of low-quality images using only high-quality images or video input, but also improve the generated low-quality image through a trained model.

In addition, it is also possible to generate image training data using a generative recurrent neural network model even in the case where access is difficult or data may not be obtained, such as military facilities or hazardous areas.

BEST MODE

In the present specification, singular forms include plural forms unless the context clearly indicates otherwise. In the specification, the terms "composed of" or "include," and the like, should not be construed as necessarily including all of several components or several steps described in the specification, and should be construed that some of the above components or steps may not be included or additional components or steps may be further included. In addition, the terms " . . . unit," "module," and the like, described in the specification refer to a processing unit of at least one function or operation and may be implemented by hardware or software or a combination of hardware and software.

Hereinafter, exemplary embodiments of the present invention will be described in detail with reference to the accompanying drawings.

Figure 1:
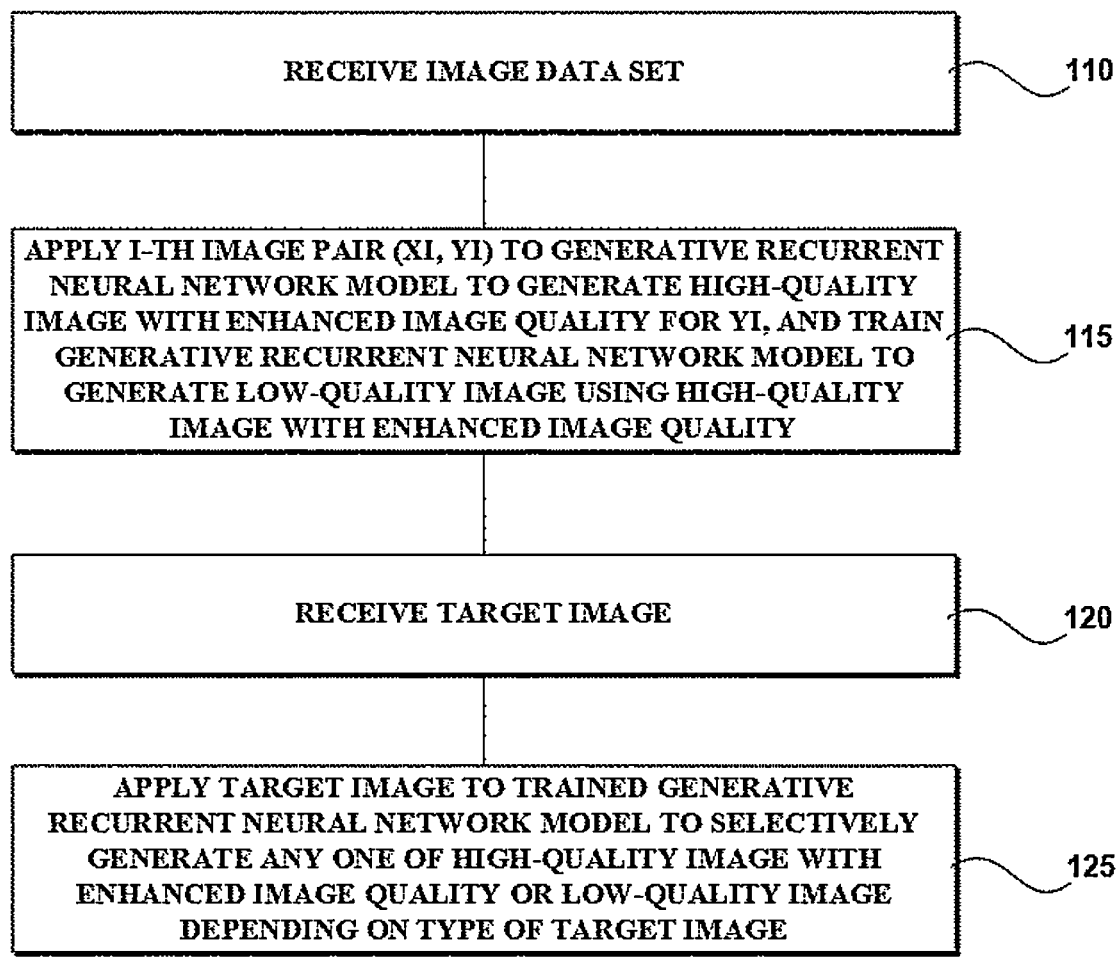
FIG. 1 is a flowchart illustrating a method of integrating image enhancement and training data generation using a generative recurrent neural network model according to an embodiment of the present invention.
Figure 2:
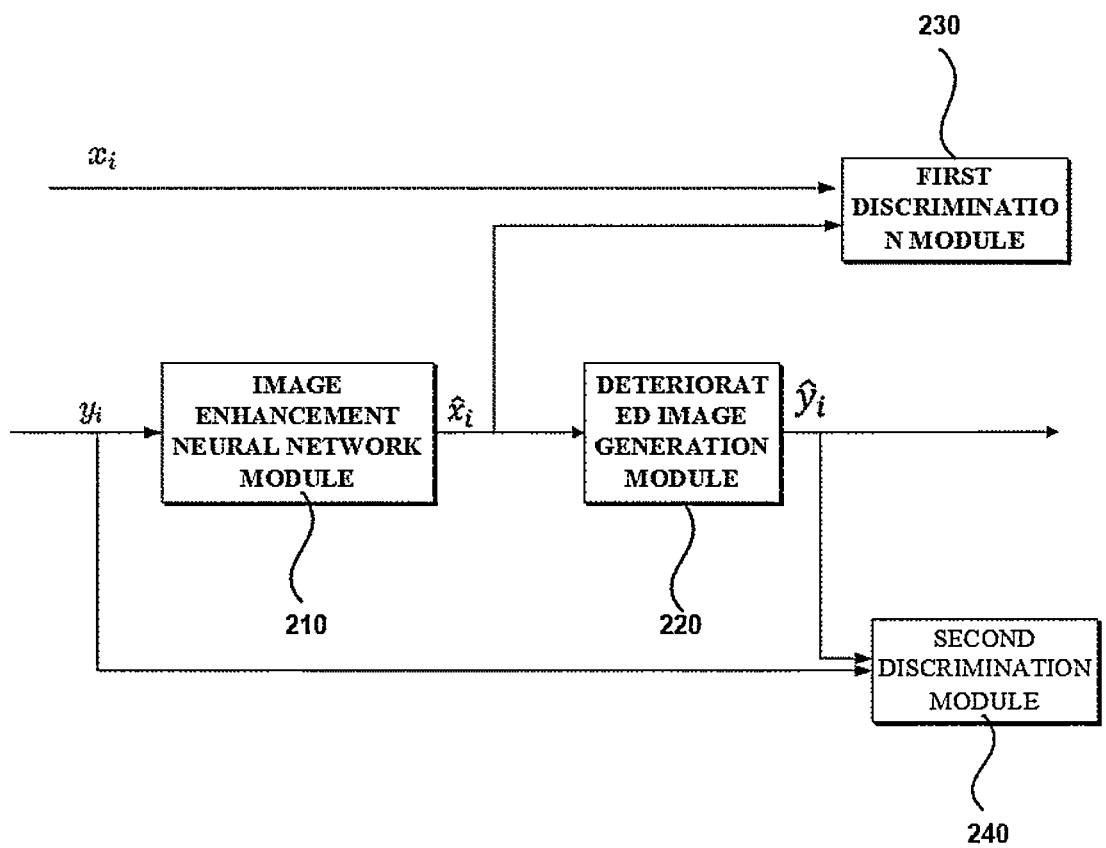
FIG. 2 is a diagram illustrating the overall configuration of a generative recurrent neural network model according to an embodiment of the present invention.
Figure 3:
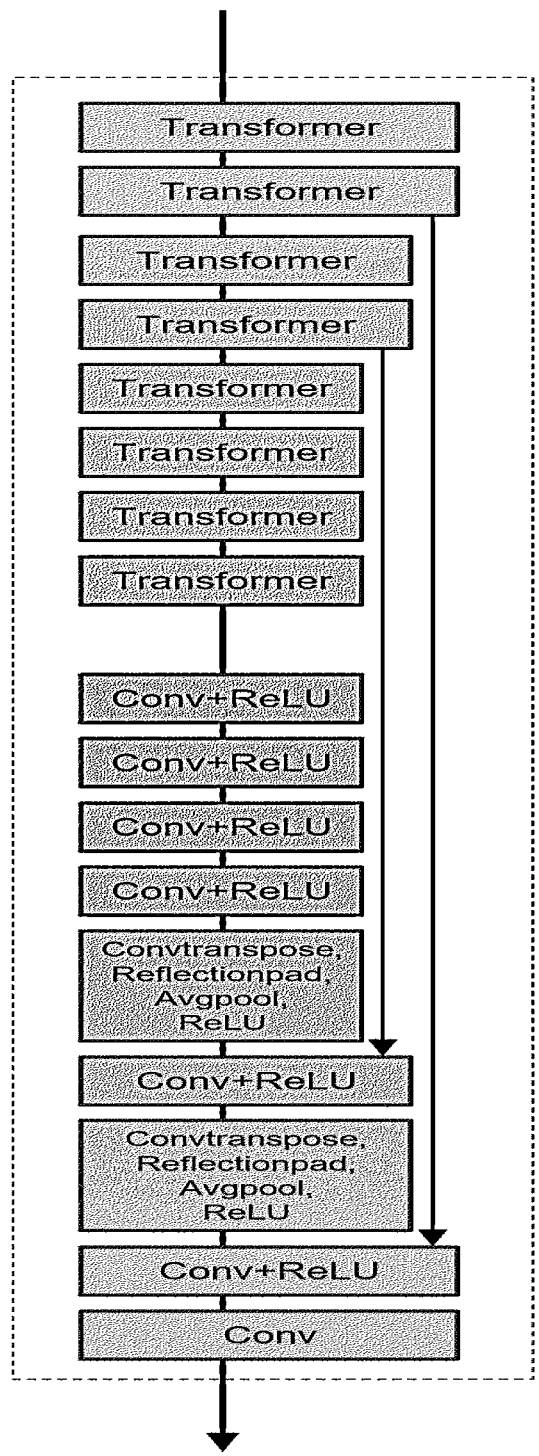
FIG. 3 is a diagram illustrating a detailed structure of an image enhancement neural network module and a deteriorated image generation module according to an embodiment of the present invention.
Figure 4:
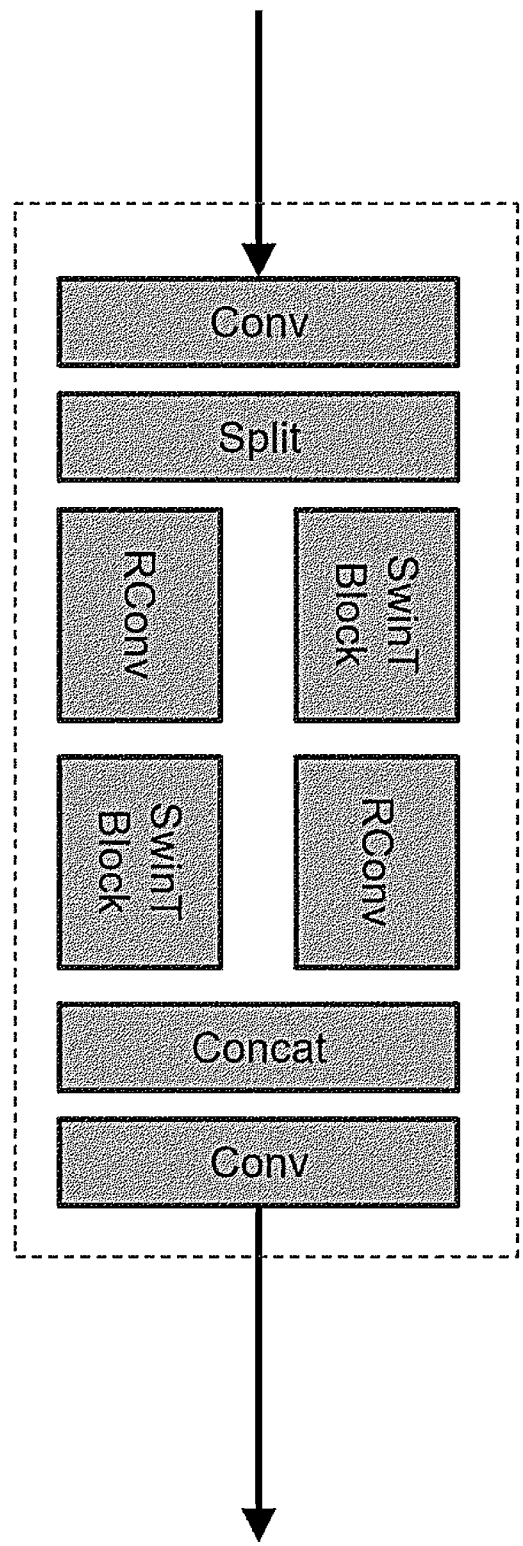
FIG. 4 is a diagram illustrating a detailed structure of a transformer block according to an embodiment of the present invention.
Figure 5:
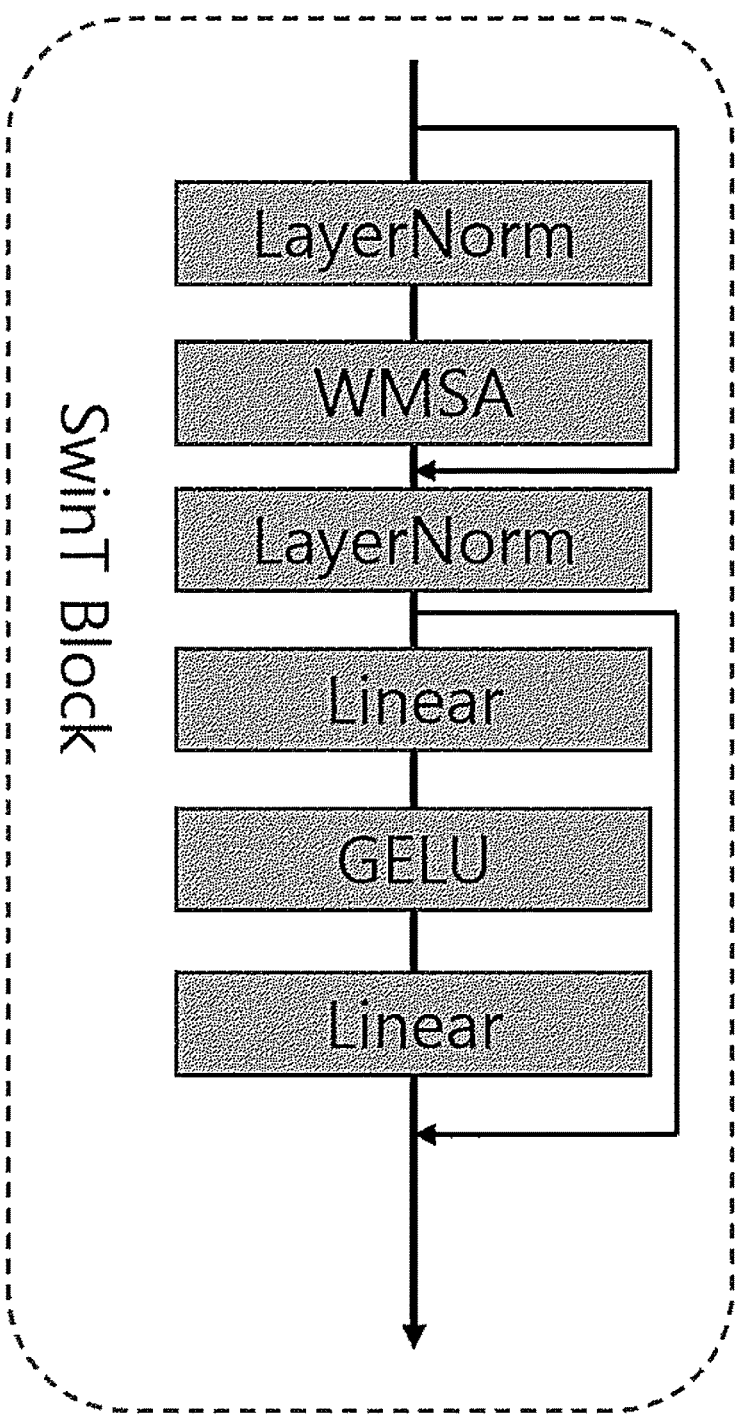
FIG. 5 is a diagram illustrating a detailed structure of a swin transformer according to an embodiment of the present invention.
Figure 6:
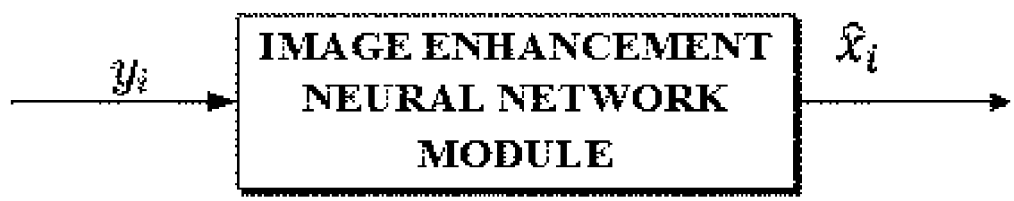
FIG. 6 is a diagram illustrating an operation of a generative recurrent neural network model when inputting a low-quality image according to an embodiment of the present invention.
Figure 7:
FIG. 7 is a diagram illustrating an operation of a generative recurrent neural network model when inputting a high-quality image according to an embodiment of the present invention.

FIG. 1 is a flowchart illustrating a method of integrating image enhancement and training data generation using a generative recurrent neural network model according to an embodiment of the present invention, FIG. 2 is a diagram illustrating the overall configuration of a generative recurrent neural network model according to an embodiment of the present invention, FIG. 3 is a diagram illustrating a detailed structure of an image enhancement neural network module and a deteriorated image generation module according to an embodiment of the present invention, FIG. 4 is a diagram illustrating a detailed structure of a transformer block according to an embodiment of the present invention, FIG. 5 is a diagram illustrating a detailed structure of a swin transformer according to an embodiment of the present invention, FIG. 6 is a diagram illustrating an operation of a generative recurrent neural network model when inputting a low-quality image according to an embodiment of the present invention, and FIG. 7 is a diagram illustrating an operation of a generative recurrent neural network model when inputting a high-quality image according to an embodiment of the present invention.

In step 110, a computing device 100 receives an image data set.

For convenience, the image data set is expressed as $\{x_i, y_i\}_{i=1}^{N}$. The image data set is composed of one pair of images with different image quality for the same scene, and may include N pairs.

Hereinafter, for convenience of understanding and description, $x_i$ will be denoted as a high-quality image of an i-th image pair, and $y_i$ will be denoted as a low-quality image of the i-th image pair.

In step 115, the computing device 100 trains the generative recurrent neural network model by applying an i-th image pair ($x_i$, $y_i$) to the generative recurrent neural network model to generate a high-quality image $\hat{x}_i$ with enhanced image quality for $y_i$, and generate a low-quality image $\hat{y}_i$ using the high-quality image with enhanced image quality.

FIG. 2 illustrates the detailed structure of the generative recurrent neural network model. This will be described in more detail with reference to FIG. 2.

As illustrated in FIG. 2, the generative recurrent neural network model is configured to include an image enhancement neural network module 210, a deteriorated image generation module 220, a first discrimination module 230, and a second discrimination module 240.

To train the generative recurrent neural network model, $y_i$ is applied to the image enhancement neural network module 210, and the image enhancement neural network module 210 may be trained to generate the high-quality image $\hat{x}_i$ with enhanced image quality for $y_i$.

The high-quality image with enhanced image quality $\hat{x}_i$, which is the output of the image enhancement neural network module 210, is transmitted to the deteriorated image generation module 220 located behind the image enhancement neural network module 210. The deteriorated image generation module 220 is trained to generate the low-quality image $\hat{y}_i$ by receiving the high-quality $x_i$ image with enhanced image quality.

The first discrimination module 230 may calculate a discrimination probability and consistency loss (for convenience, referred to as first consistency loss) using the high-quality images $\hat{x}_i$ and $x_i$ with enhanced image quality, which are the outputs of the image enhancement neural network module 210. The first discrimination module 230 has a discrimination probability of 0.5, and may adjust parameter weights of the image enhancement neural network module 210 so that the first consistency loss is minimized.

In addition, the second discrimination module 240 may calculate the discrimination probability and consistency loss (for convenience, referred to as second consistency loss) using $\hat{y}_i$ and $y_i$ which are the outputs of the deteriorated image generation module 220. The second discrimination module 240 has a discrimination probability of 0.5, and may adjust parameter weights of the deteriorated image generation module 220 so that the second consistency loss is minimized.

Using the image pairs included in the image data set, the generative recurrent neural network model may be repeatedly trained to generate an image with enhanced image quality for the low-quality image and generate the low-quality image using the image with enhanced image quality.

The image enhancement neural network module 210 and the deteriorated image generation module 220 included in the generative recurrent neural network model are composed of a structure of a plurality of transformer-based encoders and a decoder using a plurality of convolution layers, and the plurality of transformer-based encoders and the decoder using the plurality of convolution layers may be configured in a Unet structure that they have a symmetrical structure to each other.

FIG. 3 illustrates in detail the Unet structure of the image enhancement neural network module 210 and the deteriorated image generation module 220. As illustrated in FIG. 3, the image enhancement neural network module 210 and the deteriorated image generation module 220 are configured of the Unet structure having the plurality of transformer-based encoders and the decoder using the plurality of convolution layers, but during the training process, the parameters may be adjusted with different weights. Accordingly, the image enhancement neural network module 210 and the deteriorated image generation module 220 may be trained to generate images with different image quality as the parameter weights are adjusted differently from each other.

In addition, the transformer block constituting the encoders of each of the image enhancement neural network module 210 and the deteriorated image generation module 220 may be configured in a structure that extracts a global feature map for the input image (or feature map) and then extracts a local feature map, and extracts the local feature map, and extract the global feature map, and then integrate the local feature map and the global feature map, as illustrated in FIG. 4.

FIG. 4 illustrates the configuration of the transformer block. The operation of the transformer block will be briefly described with reference to FIG. 4.

As illustrated in FIG. 4, the input image (or input feature map) has a feature map extracted through the convolution layer, and the feature map extracted by the convolution layer may be split into two branches through a split layer. The split feature map may extract the global feature map (for convenience, refer to as a first global feature map) through a first swin transformer and then transmit the extracted global feature map to a first residual block located behind the first swin transformer to estimate a first local feature map. In addition, in the split feature map, a second local feature map may be extracted through a second residual block, and then a second global feature map may be estimated through a second swin transformer. The detailed structures of the first and second swin transformers are as illustrated in FIG. 5.

After combining the estimated first local feature map and second global feature map, a convolution operation may be applied to output a final feature map of the corresponding transformer block.

As illustrated in FIG. 4, each transformer block according to an embodiment of the present invention may apply the swin transformer through one branch to extract the global feature map and then transmit the extracted global feature map to the residual block located at the rear end to estimate the local feature map, and extract the local feature map through the residual block through another branch and then pass through the swin transformer located at the rear end to estimate the global feature map.

As described above, by training the generative recurrent neural network model by combining the image enhancement neural network module and the deteriorated image generation module with the generative recurrent neural network model, the low-quality or enhanced image training data may be generated as the high-quality or low-quality images for special environments (vehicle cameras, military security sites), and the model may be re-trained using the generated image training data.

The training process of the generative recurrent neural network model is described with reference to FIGS. 2 to 4.

The operation process after the training of the generative recurrent neural network model is completed using an image data set will be described.

In step 120, a computing device 100 receives a target image. Here, the target image may be a low-quality image or a high-quality image.

In step 125, the computing device 100 may apply the target image to the trained generative recurrent neural network model to selectively generate any one of the high-quality image with enhanced image quality and the low-quality image depending on the type of target image.

The trained generative recurrent neural network model may selectively operate any one of the trained image enhancement neural network module 210 and the trained deteriorated image generation module 220 depending on the type of target image.

For example, it is assumed that the image quality of the target image is the low-quality image that is equal to or lower than the standard image quality. The trained generative recurrent neural network model may operate only the image enhancement neural network module 210 among the trained image enhancement neural network module 210 and the trained deteriorated image generation module 220, and may inactivate the deteriorated image generation module 220 not to operate. Accordingly, when the target image is the low-quality image, as illustrated in FIG. 6, the trained generative recurrent neural network model may operate like the image enhancement neural network model that generates the image with enhanced image quality for the low-quality image.

As another example, it is assumed that the image quality of the target image is the high-quality image that exceeds the standard image quality. The trained generative recurrent neural network model may operate only the deteriorated image generation module 220 among the trained image enhancement neural network module 210 and the trained deteriorated image generation module 220, and may inactivate the image enhancement neural network module 210 not to operate. Accordingly, when the corresponding target image is the high-quality image, as illustrated in FIG. 7, the trained generative recurrent neural network model may operate like the deteriorated image generation model that generates the low-quality image with deteriorated image quality for the high-quality image.

Figure 8:
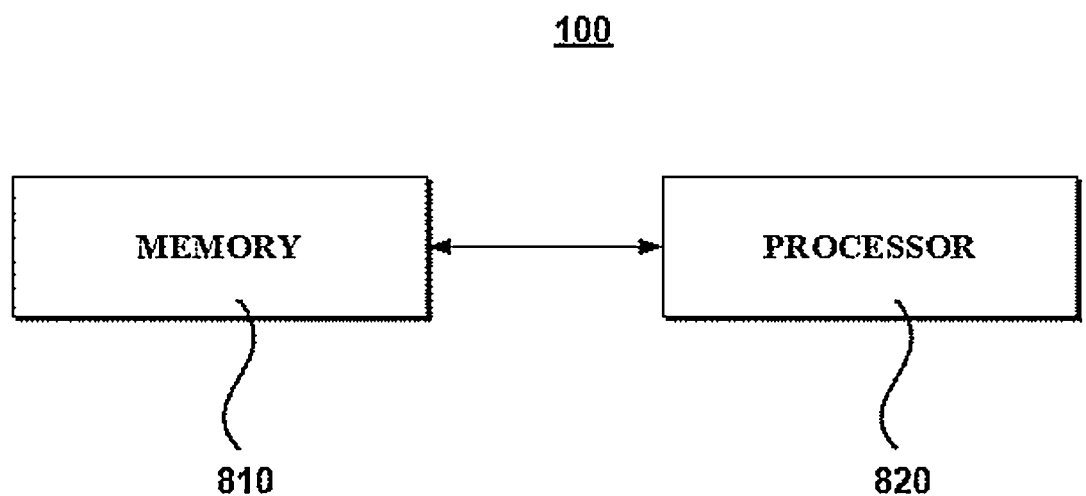
FIG. 8 is a block diagram schematically illustrating an internal configuration of a computing device according to an embodiment of the present invention.

FIG. 8 is a block diagram schematically illustrating an internal configuration of a computing device according to an embodiment of the present invention.

Referring to FIG. 8, the computing device 100 according to an embodiment of the present invention includes a memory 810 and a processor 820.

The memory 810 stores instructions for performing a method of generating training data using a generative recurrent neural network model according to an embodiment of the present invention.

The processor 820 may be linked to the memory 810 to execute the instructions stored in the memory 810.

The instructions executed by the processor 820 may perform a series of processes of receiving the target image by applying the target image to the trained generative recurrent neural network model to selectively generate any one of the high-quality image with enhanced image quality and the low-quality image depending on the type of the target image.

In addition, the instructions executed by the processor 820 may perform a series of processes for training the generative recurrent neural network model using the image data set including the first image and the second image. Since the training process is the same as described with reference to FIGS. 1 to 4, redundant description thereof will be omitted.

The apparatus and the method according to the embodiment of the present invention may be implemented in a form of program commands that may be executed through various computer means and may be recorded in a computer-readable recording medium. The computer-readable recording medium may include a program command, a data file, a data structure, or the like, alone or in a combination thereof. The program commands recorded in the computer-readable recording medium may be especially designed and constituted for the present invention or be known to or usable by those skilled in a field of computer software. Examples of the computer-readable recording medium may include magnetic media such as a hard disk, a floppy disk, and a magnetic tape; optical media such as a compact disk read only memory (CD-ROM) or a digital versatile disk (DVD); magneto-optical media such as a floptical disk; and a hardware device specially configured to store and execute program commands, such as a ROM, a random access memory (RAM), a flash memory, or the like. Examples of the program commands include a high-level language code capable of being executed by a computer using an interpreter, or the like, as well as a machine language code made by a compiler.

The above-mentioned hardware device may be constituted to be operated as one or more software modules in order to perform an operation according to the present invention, and vice versa.

The above-mentioned hardware device may be configured to be operated as one or more software modules in order to perform an operation according to the present invention, and vice versa.

Hereinabove, the present invention has been described with reference to exemplary embodiments thereof. It will be understood by those skilled in the art to which the present invention pertains that the present invention may be implemented in a modified form without departing from essential characteristics of the present invention. Therefore, the exemplary embodiments disclosed herein should be considered in an illustrative aspect rather than a restrictive aspect. The scope of the present invention should be defined by the claims rather than the above-mentioned description, and all differences within the scope equivalent to the claims should be interpreted to fall within the present invention.

What is claimed is:

1. A method of integrating image enhancement and training data generation using a generative recurrent neural network model, comprising:
    (a) receiving a target image as input; and
    (b) applying the target image to a trained generative recurrent neural network model to selectively generate one of a high-quality image with enhanced image quality and a low-quality image depending on a type of the target image,
    wherein the generative recurrent neural network model comprises:
    an image enhancement neural network module that generates the high-quality image with enhanced image quality after receiving the low-quality image among the first image and the second image;
    a deteriorated image neural network module that is located behind the image enhancement neural network module, and receives the high-quality image with enhanced image quality and then generates the low-quality image;
    a first discrimination module that adjusts a weight of the image enhancement neural network module to minimize first consistency loss for a high-quality image among the first image and the second image and the high-quality image with enhanced image quality; and
    a second discrimination module that calculates a second consistency loss using the low-quality image among the first image and the second image and the low-quality image output from the deteriorated image neural network module and then adjusts a weight of the deteriorated image neural network module so that the second consistency loss is minimized,
    wherein the image enhancement neural network module and the deteriorated image neural network module are composed of a plurality of transformer-based encoders and a decoder using a plurality of convolutional layers, respectively, and the plurality of transformers and the plurality of convolution layers are configured to have a symmetrical structure to each other, wherein each of the transformers comprises:

a convolution layer that extracts a feature map of the input image;

a split layer that splits the extracted feature map;

a first swin transformer block that receives the split feature map and extracts a first global feature map;

a first residual block that is located behind the first swin transformer block and receiving the first global feature map to extract a first local feature map;

a second residual block that receives the split feature map and extracts a second local feature map for the split feature map;

a second swin transformer block that is located behind the second residual block and receives the second local feature map and extracts a second global feature map; and the first local feature map output from the first residual block and the second global feature map output from the second swin transformer block are combined, and then pass through a convolution layer to output the feature map.

2. The method of claim 1, wherein the generative recurrent neural network model comprises a trained image enhancement neural network module and a trained deteriorated image generation module, when the image quality of the target image is equal to or lower than a standard image quality, only the trained image enhancement neural network module operates and the trained deteriorated image generation module does not operate, and when the image quality of the target image exceeds the standard image quality, only the trained deteriorated image generation module operates and the trained image enhancement neural network module does not operate.

3. The method of claim 1, further comprising:

prior to the step (a), training the generative recurrent neural network model using an image data set including a first image and a second image, wherein the training the generative recurrent neural network model includes training the generative recurrent neural network model by applying the first image and the second image to the generative recurrent neural network model to generate a high-quality image with enhanced image quality for a low-quality image among the first image and the second image and generate the low-quality image using the high-quality image with enhanced image quality.

4. The method of claim 3, wherein the first image and the second image are pair images with different image quality for the same scene.

5. A non-transitory computer-readable recording medium in which a program code for performing the method of claim 1 is recorded.

6. A computing device, comprising:

a memory that stores at least one instruction; and a processor that executes the instructions stored in the memory, wherein each of the instructions executed by the processor performs:

(a) receiving a target image as input; and (b) applying the target image to a trained generative recurrent neural network model to selectively generate any one of a high-quality image with enhanced image quality and a low-quality image depending on a type of the target image, wherein the generative recurrent neural network model comprises:

an image enhancement neural network module that generates the high-quality image with enhanced image quality after receiving the low-quality image among the first image and the second image;

a deteriorated image neural network module that is located behind the image enhancement neural network module, and receives the high-quality image with enhanced image quality and then generates the low-quality image;

a first discrimination module that adjusts a weight of the image enhancement neural network module to minimize first consistency loss for a high-quality image among the first image and the second image and the high-quality image with enhanced image quality; and a second discrimination module that calculates second consistency loss using the low-quality image among the first image and the second image and the low-quality image output from the deteriorated image neural network module and then adjusts a weight of the deteriorated image neural network module so that the second consistency loss is minimized, wherein the image enhancement neural network module and the deteriorated image neural network module are composed of a plurality of transformer-based encoders and a decoder using a plurality of convolutional layers, respectively, and the plurality of transformers and the plurality of convolution layers are configured to have a symmetrical structure to each other, wherein each of the transformers comprises:

a convolution layer that extracts a feature map of the input image;

a split layer that splits the extracted feature map;

a first swin transformer block that receives the split feature map and extracts a first global feature map;

a first residual block that is located behind the first swin transformer block and receiving the first global feature map to extract a first local feature map;

a second residual block that receives the split feature map and extracts a second local feature map for the split feature map;

a second swin transformer block that is located behind the second residual block, receives the second local feature map, and extracts a second global feature map, and the first local feature map output from the first residual block and the second global feature map output from the second swin transformer block are combined, and then pass through a convolution layer to output the feature map.

7. The computing device of claim 6, wherein the generative recurrent neural network model comprises a trained image enhancement neural network module and a trained deteriorated image generation module, when the image quality of the target image is equal to or lower than a standard image quality, only the trained image enhancement neural network module operates and the trained deteriorated image generation module does not operate, and when the image quality of the target image exceeds the standard image quality, only the trained deteriorated image generation module operates and the trained image enhancement neural network module does not operate.

8. The computing device of claim 6, wherein prior to the step (a),
training the generative recurrent neural network model using an image data set including a first image and a second image is further performed, and
the training of the generative recurrent neural network model includes training the generative recurrent neural network model by applying the first image and the second image to the generative recurrent neural network model to generate a high-quality image with enhanced image quality for a low-quality image among the first image and the second image and generate the low-quality image using the high-quality image with enhanced image quality.

* * * * *